United States Patent
Tanttu et al.

(10) Patent No.: US 9,873,070 B2
(45) Date of Patent: Jan. 23, 2018

(54) METHOD FOR PREPARING A PRECOAT ON THE SURFACE OF THE FILTER MEDIUM OF A POLISHING FILTER, POLISHING FILTER AND USE OF A POLISHING FILTER

(71) Applicant: OUTOTEC (FILTERS) OY, Lappeenranta (FI)

(72) Inventors: Leena Tanttu, Lappeenranta (FI); Janne Kauppi, Lappeenranta (FI); Yrjo Oinonen, Kokkola (FI)

(73) Assignee: Outotec (Filters) Oy, Lappeenranta (FI)

( * ) Notice: Subject to any disclaimer, the term of this patent is extended or adjusted under 35 U.S.C. 154(b) by 909 days.

(21) Appl. No.: 14/351,207

(22) PCT Filed: Oct. 10, 2012

(86) PCT No.: PCT/FI2012/050975
§ 371 (c)(1),
(2) Date: Apr. 11, 2014

(87) PCT Pub. No.: WO2013/054000
PCT Pub. Date: Apr. 18, 2013

(65) Prior Publication Data
US 2014/0231364 A1   Aug. 21, 2014

(30) Foreign Application Priority Data

Oct. 11, 2011   (FI) .................................... 20116000

(51) Int. Cl.
*B01D 37/02*   (2006.01)
*B01D 36/04*   (2006.01)

(52) U.S. Cl.
CPC ............. *B01D 37/02* (2013.01); *B01D 36/04* (2013.01)

(58) Field of Classification Search
CPC ................................ B01D 36/04; B01D 37/02
See application file for complete search history.

(56) References Cited

U.S. PATENT DOCUMENTS

| | | |
|---|---|---|
| 4,786,408 A | 11/1988 | Sahara et al. |
| 5,227,076 A | 7/1993 | Bogen et al. |
| 6,106,708 A | 8/2000 | Mayor et al. |
| 2009/0101598 A1 | 4/2009 | Kain et al. |
| 2010/0012451 A1 | 1/2012 | Lin |

(Continued)

FOREIGN PATENT DOCUMENTS

| | | |
|---|---|---|
| CL | 199200287 | 3/1982 |
| CL | 198300301 | 5/1983 |
| CL | 198900898 | 11/1989 |

(Continued)

OTHER PUBLICATIONS

Chilean Patent Office; first Office Action in Chilean application No. 902-2014; dated Jul. 27, 2016; 9 pages.

(Continued)

*Primary Examiner* — John Kim
(74) *Attorney, Agent, or Firm* — Chernoff, Vilhauer, McClung & Stenzel, LLP

(57) ABSTRACT

Methods and equipment for preparing a precoat on the surface of a filter medium of a polishing filter. A feature in the invention is that in the polishing filter, the precoat is formed either exclusively or jointly from the underflow created in the separation process.

12 Claims, 2 Drawing Sheets

(56) References Cited

U.S. PATENT DOCUMENTS

2012/0012451 A1   1/2012   Lin

FOREIGN PATENT DOCUMENTS

CL   199601598      9/1996
CN   101835708 A    9/2015

OTHER PUBLICATIONS

State Intellectual Property Office of the People's Republic of China, Office Action issued in application 201280049919.9, dated Nov. 4, 2014, 7 pages, Beijing, China.
International Search Report, PCT/FI/2012/050975, Outotec (Filters) Oy, dated Jan. 15, 2013, 5 pgs.

METHOD FOR PREPARING A PRECOAT ON THE SURFACE OF THE FILTER MEDIUM OF A POLISHING FILTER, POLISHING FILTER AND USE OF A POLISHING FILTER

This is a national stage application filed under 35 USC 371 based on International Application No. PCT/FI2012/050975, filed Oct. 10, 2012, and claims priority under 35 USC 119 to Finnish Patent Application No. FI-020116000, filed Oct. 11, 2011.

BACKGROUND OF THE INVENTION

The disclosure relates to a method for preparing precoat on the surface of the filter medium of a polishing filter. The disclosure also relates to polishing filter.

Various filtering methods are well known. One of the most demanding methods is polishing filtration. There the basic principle is to reduce the solids content of process liquids down to an extremely low level, in some applications even down to fractions of a billionth. Polishing filters can be utilized in many different applications, for example in chemical and process industry. Polishing filters can also be utilized in metallurgy plants that use electrolytic concentration processes for removing impurities. Gold and zinc plants are well able to make use of polishing filters.

The purpose of polishing filtration is to separate, as completely as possible, the extremely small solid particles contained in a liquid. The size of the particles varies. Typically the size is smaller than 1,000 nm, and by average within the range 40-400 nm. Generally particles of this size are in English called submicrons, i.e. particles having a size of order of less than one micrometer. In this invention, they are called nanosize particles, which refers to the same thing. Different types of equipment can be used for measuring the size of particles, for example the Hanna Instruments HI 93703 turbidity meter. The device is based on an 825 nm light source, and the measurement is carried out as a reflection of 90 degrees for readings below 40 FTU.

When the solids content of process liquids is reduced down to a very low level, and the particle size remains as small as this, there are several problems in the filtering process. Especially these nanosize particles, i.e. particles with a size of less than one micrometer, tend to block the filter medium in a short time. A particular problem is created by the layer impermeable to liquid that is formed on the surface and pores of the filter medium.

Thus the filter medium, such as a filter cloth or a ceramic medium, is rapidly blocked, which directly affects the filtering efficiency. This in turn increases the filtering costs, such as costs caused directly by the filter material, as well as maintenance and service costs. Moreover, aid medium costs as well as waste and post-processing volumes increase. These are extremely significant aspects considering that in process industry, particularly efficiency and all possible cost benefits are welcome.

SUMMARY

According to the invention, an arrangement has been devised where the above enlisted problems can be solved. In the arrangement according to the invention, it is essential to make use of an autogenous material created in the process as a filter aid medium comprising a precoat. Here the term 'precoat' refers to a filter aid medium that is formed essentially on the surface of the filter medium, or formed to be in connection with said medium. This kind of second filtering layer formed on the filter, such as the filter cloth, substantially improves the filtering efficiency. At the same time, better use can be made of the whole process.

In an arrangement according to the invention, polishing filtration is utilized more efficiently than in the prior art, and at the same time, the operation of the whole equipment is optimized. The inventive nature of the filtering process according to the invention is particularly based on the fact that the process in question is polishing filtration where an autogenous precoat is made use of. Here the term 'autogenous' means that the precoat is formed of essentially the same material as the material to be filtered. In practice, only the particle size of the material is different, either completely or partly. Thus it is particularly essential for the invention to make use of the underflow created in the process, with a particle size larger than in the overflow, of which underflow there is formed, by a rapid filtration, a precoat on the surface of the filter medium, to serve as a filter aid medium. Said underflow, serving as a filter aid medium, improves the separation by filtration of the solids contained in the process overflow and having a particle size smaller than the underflow, without blocking the filter medium. The filter aid medium serves as a kind of porous filter in which the solids fed at a low feed rate are filtered, possibly also precipitated, adsorbed or crystallized.

The object of the present invention is to achieve a completely new arrangement for enhancing the filtration by a polishing filter, so that the filtering efficiency is substantially improved. Different types of filters can be employed as the polishing filter. A particularly advantageous filter is a pressurized polishing filter, for instance the Outotec Larox Polishing Filter, i.e. LSF filter, or the Outotec Larox Vertical Polishing Filter, i.e. VPF filter, where the operation is based on a pressure vessel and on cloth-coated frames provided therein, in which frames the filtering process is carried out. Apart from LSF or VPF filters, also other types of filters can be used, for example precoat filters, precoat drum filters, chamber filters, pressure leaf filters or candle-type ceramic or bag polishing filters. The essential feature in the invention is the method for forming a precoat layer on the filter medium surface, and equipment for utilizing said method. More precisely, the invention is characterized by what is set forth in the appended claims.

An aspect of the invention is a method for forming a precoat on the surface of the filter medium of a polishing filter, wherein the precoat is formed either completely or partially of the underflow of a thickener or clarifier and in that the precoat serves as a filter aid medium in polishing filtration of the overflow of said thickener or clarifier.

In an embodiment of the method, the precoat serves as a filter aid medium in pressurized polishing filtration, on the surface and/or in the structure of which there are separated nanoparticle-size solids from the overflow that has a smaller particle size than the underflow.

In an embodiment of the method, the underflow having a larger particle size serves as a filter aid medium forming a porous precoat, in which the nanoparticle-size solids that are fed at a slow filtering rate and have a smaller particle size are filtered, precipitated, adsorbed and/or crystallized.

In an embodiment of the method, the particles of the filter aid medium created by the precoat formed of the underflow serve as seed crystals, in which the particles contained in the supersaturated solution of the overflow are crystallized.

In an embodiment of the method, the size of the crystals/particles contained in the underflow and in the overflow is generally less than 1,000 nm, by average 40-400 nm.

In an embodiment of the method, the precoat is formed of essentially the same substance as the substance to be filtered.

In an embodiment of the method, in the underflow and overflow comprise those of a CaSO4 clarifier.

In an embodiment of the method, the precoat used in the method is conducted back to polishing filtration, to be reused as the filter aid medium creating the precoat.

Another aspect of the invention is a polishing filter, the filter medium of which comprises a precoat, wherein the precoat is formed either completely or partially of the underflow of a thickener or clarifier, and that the precoat is arranged to serve as a filter aid medium in polishing filtration of the overflow of said thickener or clarifier.

In an embodiment of the polishing filter, the precoat is formed as a filter aid medium of a pressurized polishing filter, on the surface and/or in the structure of which there are separated nanoparticle-size solids from an overflow that has a smaller particle size than the undertow.

In an embodiment of the polishing filter, the solids from the underflow that has a larger particle size than the overflow are arranged as a filter aid medium comprising the precoat in connection with the filter medium of polishing filtration, thus boosting the filtering, precipitation, adsorption and/or crystallization of nanoparticle-size solids contained in the overflow that have a smaller particle size than the undertow.

In an embodiment of the polishing filter, the particles of the filter aid medium comprising the precoat and formed of the underflow are arranged to serve as seed crystals, in which the particles contained in the supersaturated solution of the overflow (6) are crystallized.

In an embodiment of the polishing filter, the filter aid medium arranged in the polishing filter (1) enables the filtering of such nanoparticle-size solids from the process solution where the particle size is generally less than 1,000 nm, by average 40-400 nm.

In an embodiment of the polishing filter, the equipment includes elements for conducting the used precoat back to polishing filtration, to be reused in the forming of the precoat serving as a filter aid medium.

Still another aspect of the invention is use of a polishing filter for polishing filtration of the overflow of a thickener or clarifier, wherein the precoat is formed on the surface of the filter medium of the polishing filter either completely or partially of the underflow of said thickener or clarifier.

BRIEF DESCRIPTION OF THE DRAWINGS

The invention is described in more detail below, with reference to the appended drawings, where.

DETAILED DESCRIPTION

Figure 1:
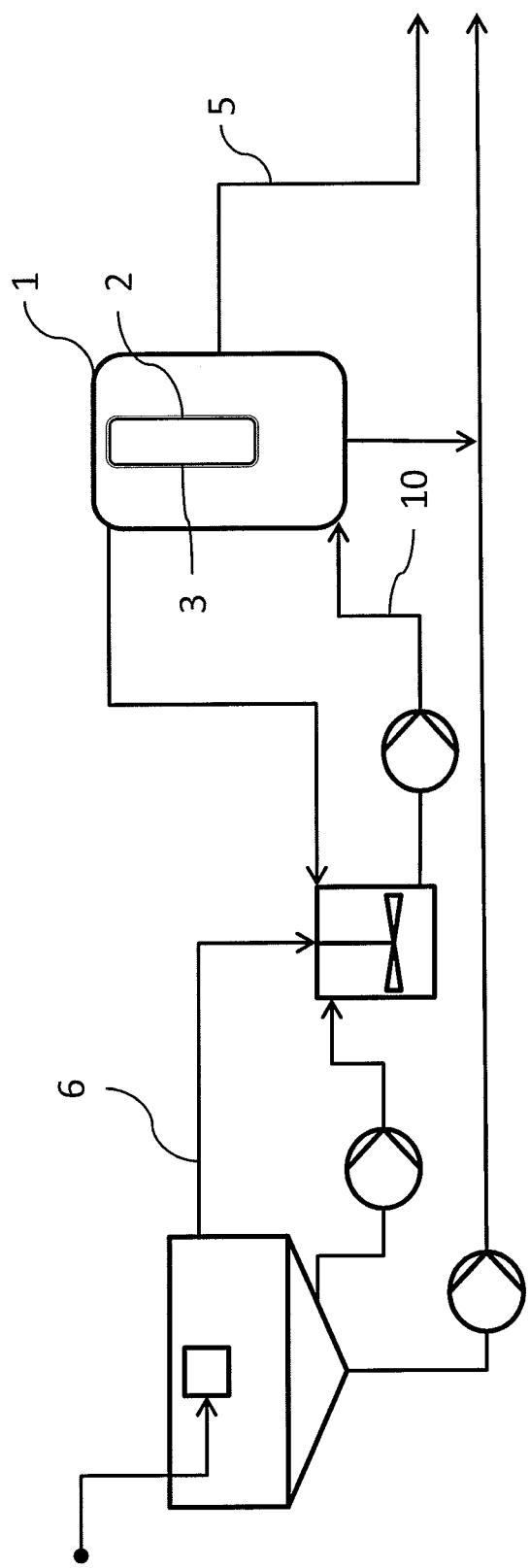
FIG. 1 is a simplified illustration of a method and equipment according to an embodiment of the invention.

FIG. 1 illustrates an embodiment of the method according to the invention, where a precoat layer 3 is formed on the surface of the filter medium 2 of a pressurized polishing filter 1. Said precoat layer 3 is formed either completely or partially of an underflow, crystals or precipitated solids obtained from a separation process, and thus the precoat 3 serves as an autogenous filter aid medium in the method.

Figure 2:
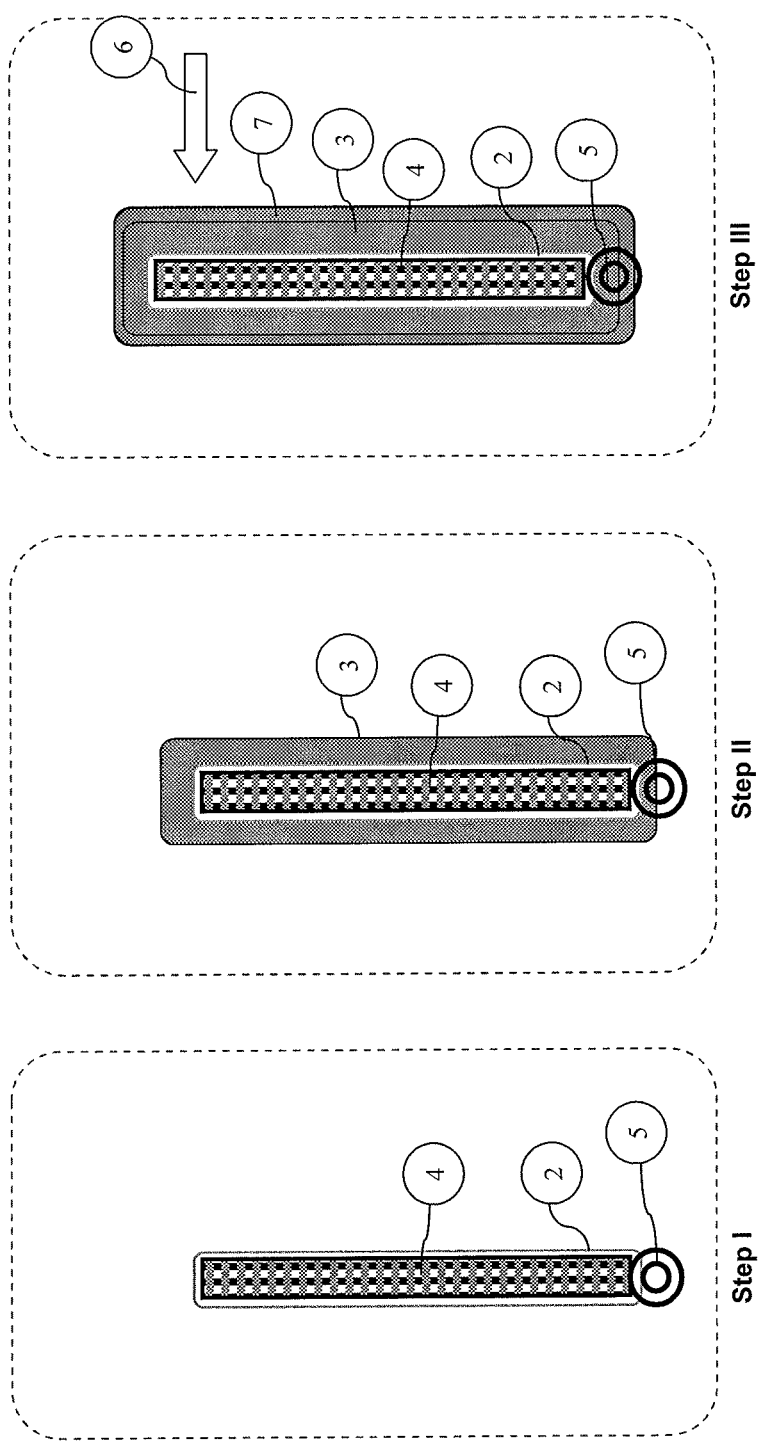
FIG. 2 is a simplified illustration of how the precoat surface is formed on top of the filter medium.

According to step I of FIG. 2, the precoat 3 is advantageously fed to an empty polishing filter 1, including a filter element 4, a filter medium 2, such as filter cloth, and a filtrate conduit 5. When the precoat 3 is fed to the filter 1, it forms an even layer on the surface of the filter medium 2, such as a filter cloth. According to step II, liquid is filtered through the cloth into the filtrate conduit 5. After forming the precoat layer 3, the solids to be filtered, such as an overflow 6, are fed to the filter 1. Filtering is carried out by means of the precoat layer 3 and the filter medium 2, according to step III, so that the small, nanoparticle-size crystals 7 are filtered by the precoat 3 serving as the filter aid medium, or by the surface thereof. Thus the filter aid medium comprising the precoat 3 serves as a kind of porous filter in which the solids 7 fed at a low feed rate are filtered, possibly also precipitated, adsorbed or crystallized.

The use of an autogenous material, i.e. material obtained from the process, as the filter aid medium forming the precoat 3, is stable in the process and does neither cause impurity residues in the process liquid nor increase mass flows in the plant. Thus said use reduces the process byproduct volumes and valuable material losses. The autogenous precoat and the filtered solids can also be returned back to the process. Moreover, the method enables the filtering of nanoparticle-size crystals 7, i.e. solids with a particle size of roughly 40-400 nm by average, from the process liquid. Consequently, by means of an arrangement according to the invention, it is possible to increase filtering efficiency, reduce process residues or possible waste and minimize the filtering costs.

An advantageous example of a method utilizing the invention is the polishing filtration of calcium sulfate overflow ($CaSO_4$) making use of polishing filtration with an autogenous precoat. In an exemplary filtration that was carried out, the employed filter aid medium forming the precoat was underflow from a gypsum thickener.

The arrangement according to the invention was reached on the basis of various experiments and test runs, because from earlier experience it was found problematic that in the course of time, gypsum was crystallized in the filter medium of the polishing filter, thus causing it to be blocked. Therefore the overflow of the $CaSO_4$ clarifier cannot, in most cases, be directly polishing filtered. The overflow rapidly crystallizes a layer impermeable to liquid on the surface of the filter medium. By means of an arrangement according to the invention, this can be avoided by using the underflow of the $CaSO_4$ clarifier as precoat material on the surface of the filter medium. The method is made even more effective when the used precoat is recycled back to polishing filtration, to be reused as filter aid medium. Advantageously the polishing filter used in the method is an LSF filter, by means of which the filtering of the $CaSO_4$ overflow is realized.

Another advantageous example of a method utilizing the invention is manganese recovery for instance from the overflow of finishing neutralization by applying polishing filtration utilizing an autogenous precoat. In a performed exemplary filtration, the autogenous precoat serving as the filter aid medium was formed by utilizing the overflow from finishing neutralization and the underflow from the gypsum thickener, which is mainly calcium sulfate ($CaSO_4$).

The aim was to make manganese sulfate, $MnSO_4$, to either crystallize in the precoat layer or to retain on the precoat layer serving as the filter aid medium. First there was formed a precoat layer on the surface of the polishing filter cloth, and the filtering of the overflow from the finishing neutralization was continued without interruptions after forming the autogenous precoat. On the basis of analysis results from a test run realized at a low flow rate, it was found that the retention of manganese sulfate was higher than 99.8%. The method is made even more effective when the used precoat is recycled back to the process, to be reused as an autogenous filter aid medium. Advantageously the polishing filter used in the method is an LSF filter, by means of which the filtering of the overflow containing $MnSO_4$ is realized.

According to the invention, it is essential that by applying the new autogenous precoat system, there is achieved an advantageous precoat that is formed of the same material as the material to be filtered, or of material obtained from the same process as the material to be filtered. The invention makes the separation filtering of solids more effective and at the same time improves the recovery of nanoparticles. A saturated solution precipitates/crystallizes nearly all of the calcium in the precoat layer or on the surface thereof according to the first exemplary embodiment, or manganese according to the second exemplary embodiment, without, however, in any way interfering with the polishing filtration process.

A person skilled in the art appreciates that the invention is not restricted to the above described embodiments, but the embodiments may vary within the scope of the appended claims.

The invention claimed is:

1. A method comprising forming a precoat on the surface of a filter medium of a polishing filter, where the precoat is at least partially formed of the underflow of at least one of a thickener and a clarifier, where the precoat serves as a filter aid medium in polishing filtration of the overflow of said at least one of a thickener and a clarifier, where particles of the filter aid medium created by the precoat formed of the underflow serve as seed crystals, where particles contained in a supersaturated solution of the overflow are crystallized, and where the precoat is formed of essentially the same material as that to be filtered from the supersaturated solution of the overflow.

2. A method according to claim 1, where the precoat is a filter aid medium in pressurized polishing filtration, on the surface and/or in the structure of which there are separated nanoparticle-size solids from an overflow that has a smaller particle size than the underflow.

3. A method according to claim 1, where the underflow has a larger particle size and serves as a filter aid medium forming a porous precoat in which nanoparticle-size solids that are fed at a slow filtering rate and have a smaller particle size are at least one of filtered, precipitated, adsorbed and crystallized.

4. A method according to claim 1, where the size of the particles contained in the underflow and in the particles contained in the overflow is generally less than 1,000 nm, by average 40-400 nm.

5. A method according to claim 1, where the precoat is formed of essentially the same substance as the substance to be filtered.

6. A method according to claim 1, where the underflow and the overflow comprise those of a CaSO4 clarifier.

7. A method according claim 1, where the precoat is conducted back to polishing filtration, and reused as the filter aid medium creating the precoat.

8. A polishing filter having a filter medium comprising a precoat, where the precoat is at least partially formed of the underflow of at least one of a thickener and a clarifier, and where the precoat serves as a filter aid medium in polishing filtration of an overflow of said at least one of a thickener and clarifier, where particles of the filter aid medium created by the precoat formed of the underflow serve as seed crystals, where particles contained in a supersaturated solution of the overflow are crystallized, and where the precoat is formed of essentially the same material as that to be filtered from the supersaturated solution of the overflow.

9. A polishing filter according to claim 8, where the precoat is a filter aid medium of a pressurized polishing filter, on the surface and/or in the structure of which there are separated nanoparticle-size solids from an overflow that has a smaller particle size than the underflow.

10. A polishing filter according to claim 9, where the solids from the underflow that has a larger particle size than the overflow are arranged as a filter aid medium comprising the precoat in connection with the filter medium of polishing filtration, and boost at least one of the filtering, precipitation, adsorption and crystallization of nanoparticle-size solids contained in the overflow that have a smaller particle size than the underflow.

11. A polishing filter according claim 8, where the filter aid medium arranged in the polishing filter enables the filtering of such nanoparticle-size solids from the process solution where the particle size is generally less than 1,000 nm, by average 40-400 nm.

12. A polishing filter according claim 8, including elements for conducting used precoat back to polishing filtration, to be reused to form the precoat serving as a filter aid medium.

* * * * *